United States Patent Office 3,560,057
Patented Feb. 2, 1971

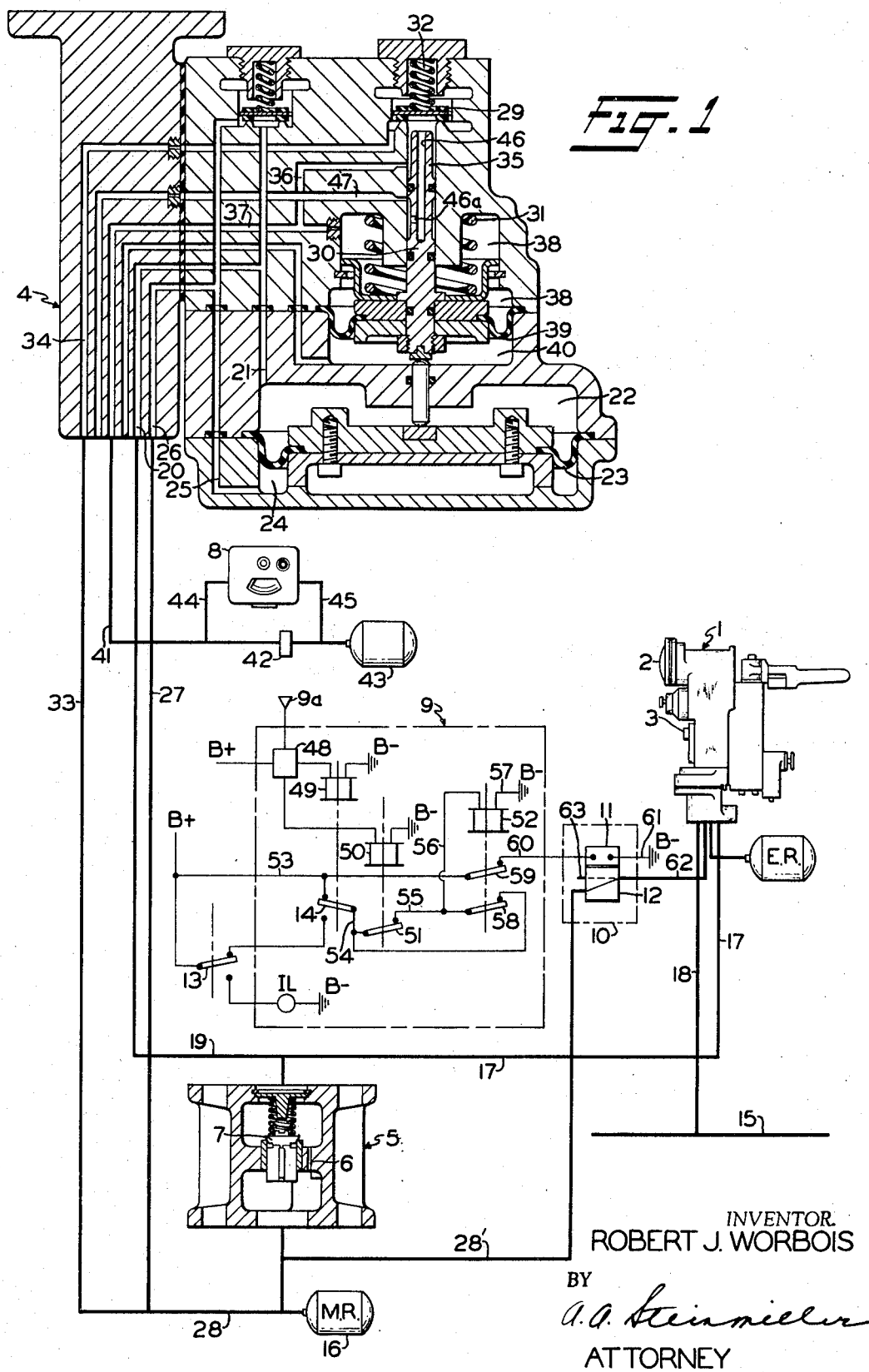

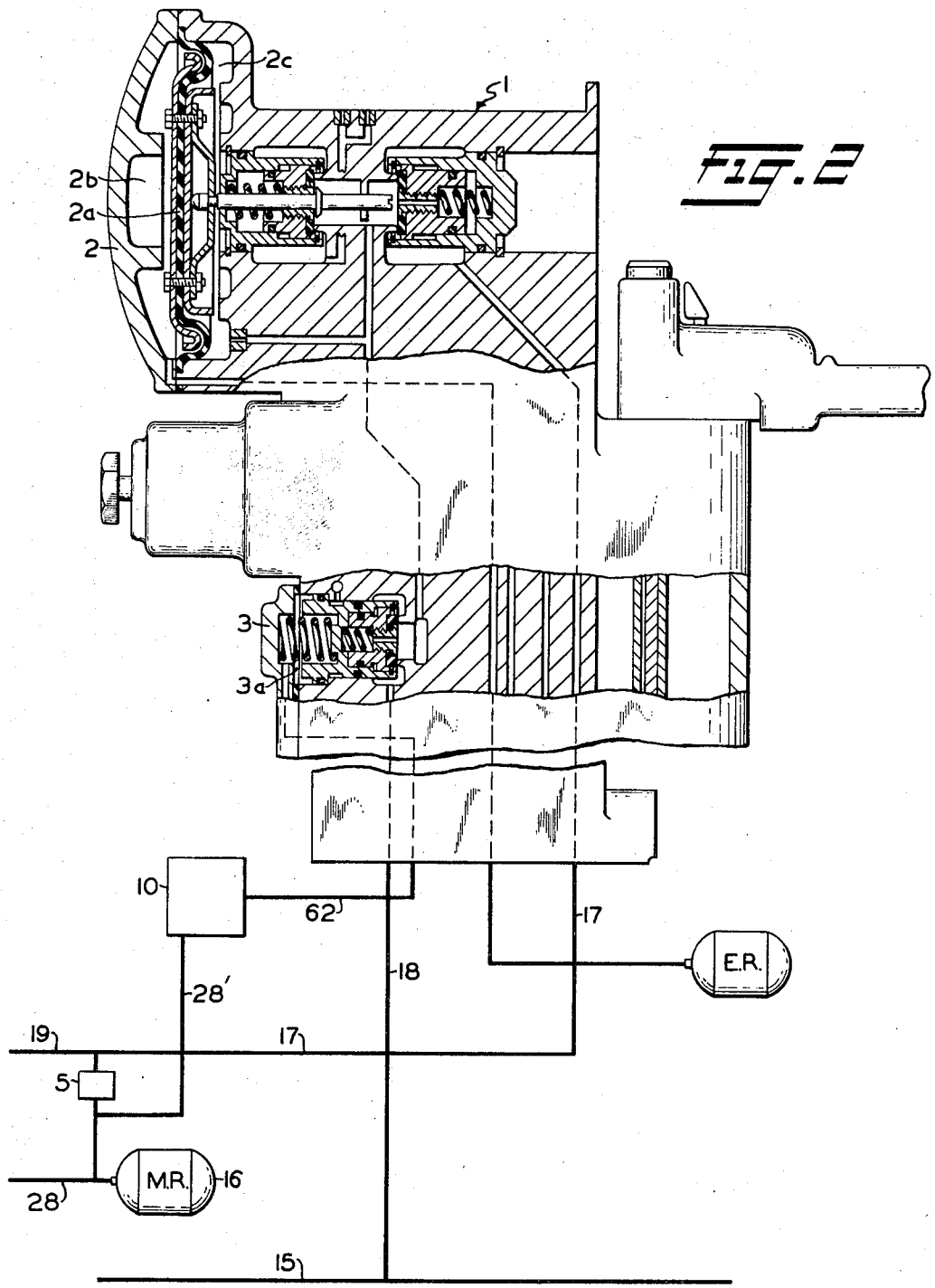

3,560,057
FLUID PRESSURE BRAKE APPARATUS FOR REMOTE MULTIPLE UNIT LOCOMOTIVE TRAINS
Robert J. Worbois, Irwin, Pa., assignor to Westinghouse Air Brake Company, Wilmerding, Pa., a corporation of Pennnsylvania
Filed May 28, 1969, Ser. No. 828,670
Int. Cl. B60t 15/18
U.S. Cl. 303—67         4 Claims

ABSTRACT OF THE DISCLOSURE

An apparatus utilized in multiple unit train brake controls whereby electrical circuitry, including a brake pipe flow indicator in cooperation with a control signal communication continuity sensing relay, is employed for preventing an undesired recharging of the brake pipe at a location remote from the lead locomotive by operation of a brake valve on a remote locomotive in the train, which recharging would otherwise result when a brake pipe reduction calling for a brake application on the train is effected by the operaton of the brake valve on the lead locomotive at a time when normal control signal communication between the lead locomotive and said remote locomotive is interrupted, thereby preventing initiation of such brake application at said remote locomotive in normal manner.

BACKGROUND OF INVENTION

A remote multiple unit brake equipment for very long freight trains is presently being utilized wherein a brake control means on a master unit, usually on a locomotive at the head of the train, effects control over the brakes in various slave units interspersed throughout the train, via radio-communicated signals between the master unit and the slave units. The brake valve handle on each of the slave units is locked in release position for maintaining the brake pipe charged. Brake control commands from the lead locomotive are received at function selectors on the slave units via the radio-communicated signals from the master unit. Receipt of the signals causes the function selector and a brake control center to cause the brake valve on the slave unit to respond so as to duplicate the indicated brake control operation by a corresponding variation of the equalizing reservoir pressure. If a brake application signal is given and the normal radio communication from the master unit to the slave unit is interrupted, the function selector and thus the brake control center on the remotely located slave units will not operate to control the remote brake valve to initiate an intended application, and the remote brake valve will continue to operate to attempt to charge the brake pipe, thus nullifying the reduction of brake pipe pressure at the remote unit resulting from operation of the brake valve on the lead locomotive. The undesired situation is thus created wherein while the master unit is attempting to apply the brakes by reduction of brake pipe pressure, the remote units are attempting to recharge the brake pipe, thereby preventing the application of the brakes on the remote unit and on associated cars in the train.

SUMMARY OF INVENTION

According to the present invention, there is provided for a multiple unit train an electrically piloted pneumatic brake control apparatus located on a remote locomotive unit for controlling a brake application thereon, said apparatus comprising a pneumatically operated self-lapping or proportioning type control valve for sensing a change in pressure in the main reservoir supply pipe at the remote locomotive unit and an electrical means utilizing the brake pipe flow indicator and function selector on the remote unit when radio communication from the master unit is interrupted. Upon sensing the change in pressure in the main reservoir supply pipe effected by reduction of pressure in the brake pipe as communicated from the lead locomotive unit, the aforesaid control valve on the remote unit operates cooperatively with a brake pipe flow indicator to cause operation of a magnet valve of a brake control center at the remote unit to supply main reservoir pressure on the remote unit to the usual brake pipe cut-off valve in the brake valve on the remote unit to prevent charging of the brake pipe at said remote unit during a brake application initiated from the lead locomotive and following such application until the present apparatus on the remote unit is manually restored to normal operation by controls on the lead locomotive after the aforesaid interrupted radio communication thereto has been restored.

In the accompanying drawings, FIG. 1 shows apparatus embodying the invention and located on a remote locomotive in a train having multiple unit locomotives.

FIG. 2 shows additional details of the brake valve utilized on the remote locomotive in cooperation with the apparatus of FIG. 1.

DESCRIPTION

Referring to FIG. 1 of the drawings, there is shown the apparatus on a locomotive unit located remotely in a train from the lead or master locomotive unit. The apparatus as shown includes a conventional brake valve 1 having the usual relay valve 2 and brake pipe cut-off valve 3 (shown in detail in FIG. 2), such as the well-known WABCO 26–C brake valve, as disclosed in U.S. Pat. No. 2,958,561. As is described in the just-mentioned patent, the relay valve 2 is of the well-known type having a diaphragm piston 2a subject opposingly to the equalizing reservoir pressure in a chamber 2b at one side thereof and the brake pipe pressure in a chamber 2c at the opposite side thereof to position a piston stem and valve arrangement to control the flow of main reservoir pressure to charge the brake pipe by way of the brake pipe cut-off valve 3 as is shown in FIG. 2. Supply of fluid under pressure to a chamber 3a of the cut-off valve 3 will prevent the just-described charging of the brake pipe in the usual well-known manner. The apparatus also includes a standard 28–VB type control valve device 4 (as disclosed in U.S. Pat. No. 3,188,147) interposed between a standard flow indicator adapter 5, and a brake pipe flow indicator device 8 of the type disclosed in U.S. Pat. No. 3,304,420. Adapter 5 comprises a spring-loaded check valve 6 and a choke 7 in parallel therewith, the pressure differential across which serves to control operation of the control device 4.

The apparatus further includes the usual so-called function selector 9 which is normally controlled electronically as by radio-communicated signals received at antenna 9a to control the operation of a brake control center 10 in a well-known manner described in part hereinafter, to in turn control the brake valve 1 on the remote locomotive. The brake control center 10 includes a plurality of magnet valve devices, only one of which, namely a magnet valve device 11 is shown herein operating a delivery valve device 12 as controlled by control circuitry including a contact member 13 of the flow indicator device 8 and other contact members described hereinafter, one of which is a communication continuity contact member 14 of the function selector 9.

Under normal operating conditions, the handle of brake valve 1 on the remote unit is in brake release position to maintain the brake pipe 15 charged in a normal manner from main reservoir 16 via the flow indicator adapter 5 to the main reservoir pipe 17, the relay valve 2 of the brake valve 1 and pipe 18. When a brake application is called for on the master unit or lead locomotives (not shown), radio signals are transmitted to the antenna 9a of the function selector 9 on the remote unit which in turn controls operation of a brake control center 10 through piping and circuits (not shown) in a well-known manner, to reduce the pressure in the usual equalizing reservoir (E.R.) connected by a pipe to the brake valve to cause operation of the relay valve 2 on the brake valve to effect a brake pipe reduction and initiation of the brake application in the usual manner. Suitable conventional brake control valve apparatus (not shown) is provided to effect supply of fluid under pressure to the brake cylinders (not shown) to cause a brake application responsively to the reduction in brake pipe pressure.

If radio communication from the master unit is interrupted, the function selector 9 on the remote unit will not function to operate the brake control center 10 to control the brake application, and the brake valve 1 thereon will be unable to recognize a brake pipe reduction from the master unit as an intended brake application, but will attempt to restore the brake pipe reduction by recharging the brake pipe locally as previously referred to. This unintended recharging is prevented by the present apparatus in the manner now to be described. With the handle of brake valve 1 on the remote unit in brake release or running position, the relay valve 2 of the brake valve operates in the usual manner, in consequence of reducing brake pipe pressure in chamber 2c by the reason of the higher equalizing reservoir pressure in chamber 2b to cause the piston stem and valve arrangement of the relay valve 2 to be positioned to permit main reservoir pressure to flow therethrough to replenish the brake pipe 15. Simultaneously, the pressure in the pipe 17 delivering the fluid under pressure from the main reservoir to the brake pipe, and similarly the pressures in a pipe 19, and passages 20, 21 to a control chamber 22 of the control valve 4 (normally charged to main reservoir pressure) are all reduced due to said supply to the brake pipe 15. The control chamber 22 in the control valve 4 is on one side of a movable abutment or diaphragm piston 23. A chamber 24 is on the opposite side of diaphragm piston 23 and is connected by passages 25, 26 and pipes 27, and 28 to the inlet side of the flow adapter 5 and to the main reservoir 16. With the reduction of pressure in control chamber 22 effected by reduction in pressure in pipe 17 as just described, due to flow of fluid under pressure to the brake valve 1, the greater pressure in chamber 24 causes the diaphragm piston 23 to be moved upward to effect opening of an application check valve 29 via the medium of a piston stem 30, in opposition to springs 31 and 32. Opening of the application check valve 29, permits fluid under pressure from the main reservoir 16 to flow via pipe 28, pipe 33, passage 34, past the unseated application check valve 29, through a peripheral annular groove 35 on the piston stem 30, and passages 36 and 37 leading to both a pressure balancing chamber 38 on one side of a diaphragm 39 (a chamber 40) on the opposite side being connected to atmosphere), and to pipe 41 leading to a choke 42 and a volume reservoir 43. Due to the effect of the choke 42, a pressure differential is created thereacross which is effective on the flow indicator 8, via pipes 44 and 45, to cause operation thereof in a well-known manner. Operation of the indicator 8 to indicate such pressure differential effects operation of a contact member 13 thereof to its down closed position and causes completion of indication circuitry explained hereinafter including a signal means or light indicator means shown herein as a light "IL."

When the aforesaid fluid pressure build-up in the pressure balancing chamber 38 becomes sufficient, in cooperation with spring 31, to overcome the previously established pressure differential on diaphragm 23, the piston stem 30 moves downward a slight degree to a lap position in which the application check valve 29 is seated to stop supply of fluid under pressure to chamber 38, while the end of the piston stem 30 remains in contact with the check valve 29 such that exhaust through passage 46 to an exhaust passage 47 cannot take place.

As long as no pressure differential across the choke 42 is indicated, the indicator 8 operates to effect closure of the flow indicator contact member 13 in its upper closed position to establish a standby circuitry to the function selector circuitry explained hereinafter for use during loss of signal thereto in a manner described hereinafter.

Under normal conditions of operation following a normal brake application, communication is established from the lead locomotive to the antenna 9a of the function selector 9 with a normal brake release signal being transmitted. This signal as received by the function selector 9 is fed to electronic controls 48 (not described) which in turn operates in a known manner, an understanding of which is not necessary herein, to effect energization of a communication continuity relay 49 and while a brake release signal is being transmitted, a brake release relay 50. With the relays 49 and 50 energized, the respective contact members 14 and 51 thereof will be in their respective upper closed position as shown to thereby complete circuitry to energize a self-holding relay 52 from the power supply B+, wire 53, contact member 14 or relay 49 in its upper closed position, wire 54, contact member 51 of relay 50 in its closed position, wires 55 and 56 to the winding of relay 52 and thence to ground via wire 57. With relay 52 energized, the contact members 58 and 59 thereof are held in their respective upper closed positions as shown, with contact member 58 establishing a self-holding circuit. The self-holding circuit may be traced via B+ supply wire 53, contact member 14 of relay 49, wire 54, contact member 58, and wire 56 to the relay 52 to maintain the relay 52 energized as long as communication continuity exists between the lead and remote locomotives as is indicated by the positioning of contact member 14 of relay 49 in its upper closed position. The closure of contact member 59 of relay 52 establishes a circuit including B+ supply, wire 53, contact member 59, wire 60, the winding of magnet valve device 11 and wire 61 to ground to thereby energize said magnet valve device 11. With magnet valve device 11 energized, the two position delivery valve portion 12 thereof is maintained in the position shown in broken lines such that a pipe 62 leading to the brake pipe cut-off portion 3 of the brake valve 1 is connected to atmosphere at port 63 in the delivery valve 12. With pipe 62 connected to atmosphere the brake valve 1 functions in a usual well-known manner to maintain the brake pipe 15 charged.

Still under normal conditions with signal communication established, a "running" signal from the locomotive may be initiated and the "brake realease" signal terminated to effect de-energization and drop-out of the brake release relay 50 to open the contact member 51 thereof which at this time will not alter the circuit conditions for energizing the relay 52 due to the previous closing of the self-holding contact member 58 of the relay 52 to maintain the relay 52 energized from B+ as traced previously via wire 53 contact member 14 in its upper closed position, wire 54, closed contact member 58, wire 55, and wire 56 to the winding of relay 52, to thereby maintain the relays 49, 52 and magnet valve device 11 all cooperatively energized in a normal "running" condition.

Under normal conditions with signal communication established between the lead locomotive and the function selector 9 on the remote unit, the function selector 9 will operate in a well-known manner utilizing electronic controls 48 to operate relays (not shown) to control operation of magnet valve devices (not shown) in the brake control center 10 to effect operation of the brake valve 1 to cause a normal brake application in a well-known manner.

If a brake application is called for from the lead locomotive and the signal is not received at the remote locomotive for any reason that could effect this loss of communication, the undesired condition of recharge of the brake pipe remotely would occur as previously described. With the new apparatus described herein, this undesired recharging is prevented in that immediately upon loss of radio signal communications between the lead locomotive and the function selector 9 of the remote unit, the signal is lost to the electronic controls 48 therein and the communication continuity relay 49 is de-energized such that the contact member 14 thereof is moved to its lower closed position to cooperate with the contact member 13 of the indicator 8 in its upper closed position to appear to complete a standby circuitry to maintain energization to relay 52 as desired. However, during a brake application where a flow is indicated by the indicator 8 as previously described, the standby circuitry is interrupted when (as previously described), the contact member 13 moves to its lower closed position, thereby effecting de-energization of relay 52 and drop-out and opening of the contacts 58 and 59 thereof. With opening of contact member 59, the magnet valve device 11 is de-energized and the delivery valve portion 12 is moved to a position whereby venting of pipe 62 is cut-off and fluid under main reservoir pressure is supplied via pipe 28′ and the delivery valve to the pipe 62 to the pressure chamber 3a of brake pipe cut-off valve 3 of the brake valve 1 to cause closing of the brake pipe cut-off valve 3 and thus prevent further brake pipe charging in a well-known manner, while the radio signal communication to the function selector is interrupted. Thus, the undesired recharging of the brake pipe at the remote unit is prevented when a radio-communicated brake application signal initiated at the lead locomotive is not received at the remote location.

The just described termination of brake pipe recharging results in a rapid equalization of pressures in the pipes 17, 19, 28 and 28′, the outlet and inlet, respectively of the adapter 5 such that the pressures in chambers 22 and 24 on opposite sides of the diaphragm 23 rapidly become equalized to permit the spring 31 to move the piston stem 30 to position the diaphragm 23 in its neutral or release position (as shown) whereby the exhaust passageway 46 in the stem 30 is moved away from the application check valve 29 to permit the volume 43, pipe 41, compensating chamber 38 and passages 36 and 37 all to be vented via the annular groove 35 on the piston stem, the exhaust passageway 46 and port 46a, and exhaust passage 47 to atmosphere. The duration of time in which the flow indicator contact member 13 is closed can be regulated by regulation of the respective sizes of the choke 42 and volume 43. It can thus be seen that each time there is a pressure equalization across the indicator adapter 5, the diaphragms and piston of the control valve 4 are all repositioned in a release position and the flow indicator 8 functions to position the indicator contact member 13 in its upper closed position as described before as a part of a "standby" circuitry. However the circuitry to energize relay 52 has previously been interrupted by the opening of both contact member 51 of the brake release relay 50 and the self-holding contact member 58, and relay 52 cannot now be energized by the standby circuitry. Only when both the communication continuity is restored, and the function selector 9 properly receives a brake release radio signal transmitted thereto from the lead locomotive, to cause respectively, the movement of the communication continuity contact member 14 to its upper closed position and the contact member 51 of brake release relay 50 to be closed, is circuitry completed to again effect energization of relay 52 and thus energization of the magnet valve device 11. Energization of the magnet valve device 11 causes operation of the delivery valve device 12 to prevent further supply of main reservoir pressure to the brake pipe cut-off valve 3 and venting of the usual control chamber 3a (FIG. 2) of said brake pipe cut-off valve 3 to restore control of brake pipe recharging at the brake valve in a normal well-known manner. Any recharging of the brake pipe effected by restoration of the aforesaid recharging control to the brake valve 1 will result in a pressure differential across the flow indicator adapter 5 to cause operation of the control valve 4, flow indicator 8 and flow indicator contact member 13 in its down closed position in a manner previously described. However such operation will be of no consequence once the communication continuity has been restored, since the communication continuity contact member 14 will remain in its upper closed position and with the relay 52 maintained energized by its contact member 58 following a brake release signal, the magnet valve device 10 is maintained energized such that brake pipe recharging is under the control of the brake valve 1 in a normal manner until a signal from the lead locomotive to the function selector 9 effects other operating conditions.

Having now described the invention, what I claim as new and desire to secure by Letters Patent is:

1. Fluid pressure brake control apparatus for use on a locomotive unit intermediately located in a train of cars having a lead locomotive from which the intermediate locomotive unit is remotely controlled via radio-communicated signals, said apparatus comprising the combination of a brake pipe normally charged to a chosen pressure, reduction from which initiates a brake application on cars in the train, an equalizing reservoir, a brake valve means having a relay valve device controlled according to variations in the differential between equalizing reservoir pressure and brake pipe pressure to control the supply of fluid pressure to or its release from said brake pipe, a brake pipe cut-off valve means operable normally to enable charging of the said brake pipe by fluid under pressure supplied by operation of the relay valve device and having a pressure chamber which when charged incident to initiation of a brake application causes the cut-off valve means to be closed to prevent charging of the brake pipe by operation of the relay valve device, and electrical brake control means remotely controlled via radio-communicated signals from the lead locomotive, to normally effect reduction of equalizing reservoir pressure to cause operation of said relay valve device to effect a brake pipe reduction resulting in a brake application, wherein the improvement comprises the combination of:

(a) choke means across which a pressure differential is created by flow of fluid under pressure supplied to the relay valve device for charging the brake pipe, (b) volume means connected to a conduit having an orifice means therein, (c) fluid pressure operated valve means subject to the pressure differential across said choke means and operable responsively to a predetermined value thereof to effect a supply of fluid under pressure to said volume means via said orifice means in said conduit, (d) switch means operative responsively to a pressure differential across said orifice means created by a predetermined rate of flow of fluid under pressure to said volume means, (e) control means operative to one condition responsively to a loss of said radio-communicated control signal to said intermediate locomotive unit and to a second condition with receipt of said signal, (f) magnet valve means operative responsively to cooperative operation of said switch means and said control means to effect control of supply of fluid under pressure to said pressure chamber of said relay valve device.

2. The combination as claimed in claim 1, further characterized in that said fluid pressure operated valve means comprises:

(a) a normally closed valve, (b) diaphragm piston means subject in a chamber on one side to the pressure of fluid supplied to said choke means and in a chamber on the opposite side to the pressure of fluid supplied from the choke means to the relay valve device and operative responsively to a predetermined differential of pressure in the respective chambers on said one side and said opposite side to operate said valve to open position in which fluid under pressure flows past the valve to said volume, and (c) diaphragm means subject in a chamber at one side thereof to the pressure of fluid supplied past said valve to said volume, for counterbalancing the differential force on said diaphragm piston means to effect restoration of said valve to its closed position.

3. The combination as claimed in claim 1, further characterized in that said control means comprises:

(a) a first relay means having a contact member operative responsively to receipt of a radio-communicated signal in said intermediate locomotive to a first circuit-closing position and operative responsively to loss of receipt of said radio-communicated signal to a second circuit-closing position, (b) a second relay means having a contact member normally in open position and operative responsively to receipt of a particular radio-communicated signal to a circuit-closing position, (c) a third relay means having a pair of contact members operative to respective circuit-closing positions responsively to energization of said third relay means, (d) said contact member of said first relay means in its first circuit-closing position and said contact member of said second relay means in its circuit-closing position being effective to establish a circuit for initially energizing said third relay means, (e) a first contact member of said pair of contact members of said third relay means and said contact member of said first relay means being effective to establish a self-holding circuit for said third relay means, and (f) a second contact member of said third relay means being effective in its closed position while said third relay means is energized to establish circuitry for maintaining said magnet valve means energized to effect venting of said pressure chamber of said brake pipe cut-off valve.

4. The combination as claimed in claim 3, further characterized in that the switch means includes a contact member positioned in a first position responsively to a rate of flow of a degree lower than said predetermined rate of flow of fluid under pressure to said volume means and positioned in a second position responsively to said predetermined rate of flow or a greater rate, said contact member in said first position cooperating with said contact member of said first relay in its second closing position and said second contact member of said third relay means in its closed position to maintain a circuit for energizing said third relay means and operative in said second position to interrupt said circuit when said contact member of said first relay is in its second circuit-closing position as effected by the loss of said radio-communicated signal to thereby cause operation of said magnet valve means to supply fluid under pressure to said pressure chamber of said brake pipe cut-off valve.

References Cited
UNITED STATES PATENTS

| | | | |
|---|---|---|---|
| 3,022,119 | 2/1962 | May | 303—67 |
| 3,374,035 | 3/1968 | Howard | 303—20 |

DUANE A. REGER, Primary Examiner

U.S. Cl. X.R.

303—20

PO-1050
(5/69)

UNITED STATES PATENT OFFICE
CERTIFICATE OF CORRECTION

Patent No. __3,560,057__   Dated __February 2, 1971__

Inventor(s) __Robert J. Worbois__

It is certified that error appears in the above-identified patent and that said Letters Patent are hereby corrected as shown below:

Column 2, line 50, numeral "6" should be --7--; same li numeral "7" should be --6--.

Column 6, line 67, after the comma "," insert --and--; line 71, erase "relay" and insert --brake pipe cut-off--.

Signed and sealed this 16th day of November 1971.

(SEAL)
Attest:

EDWARD M. FLETCHER, JR.          ROBERT GOTTSCHALK
Attesting Officer                Acting Commissioner of Patents